(12) United States Patent
Cho et al.

(10) Patent No.: US 11,307,091 B2
(45) Date of Patent: Apr. 19, 2022

(54) APERTURELESS SPECTROMETER

(71) Applicant: Answeray Inc., Gwacheon-si (KR)

(72) Inventors: Seong Ho Cho, Gwacheon-si (KR); Gajendra Pratap Singh, Uttar Pradesh (IN)

(73) Assignee: Answeray Inc., Gwacheon-si (KR)

( * ) Notice: Subject to any disclaimer, the term of this patent is extended or adjusted under 35 U.S.C. 154(b) by 0 days.

(21) Appl. No.: 17/105,946

(22) Filed: Nov. 27, 2020

(65) Prior Publication Data

US 2021/0164835 A1 Jun. 3, 2021

(30) Foreign Application Priority Data

Nov. 29, 2019 (KR) .......... 10-2019-0157775
Nov. 26, 2020 (KR) .......... 10-2020-0160960

(51) Int. Cl.
| | |
|---|---|
| *G01J 3/44* | (2006.01) |
| *G01J 3/02* | (2006.01) |
| *G01J 3/18* | (2006.01) |
| *G01J 3/28* | (2006.01) |
| *G01J 3/10* | (2006.01) |
| *G01J 3/12* | (2006.01) |

(52) U.S. Cl.
CPC .......... *G01J 3/0208* (2013.01); *G01J 3/0216* (2013.01); *G01J 3/0291* (2013.01); *G01J 3/10* (2013.01); *G01J 3/18* (2013.01); *G01J 3/2803* (2013.01); *G01J 3/44* (2013.01); *G01J 2003/1213* (2013.01)

(58) Field of Classification Search
CPC .......... G01J 3/0208; G01J 3/0291; G01J 3/18; G01J 3/14; G01J 3/0216; G01J 3/2803; G01J 3/44; G01J 3/10; G01J 2003/1213; G01J 3/02; G01J 3/28
See application file for complete search history.

(56) References Cited

U.S. PATENT DOCUMENTS

| | | | | |
|---|---|---|---|---|
| 5,329,353 | A * | 7/1994 | Ichimura | G01J 3/18 356/301 |
| 2005/0007586 | A1* | 1/2005 | Bastue | G01J 3/18 356/328 |
| 2013/0188181 | A1* | 7/2013 | Angel | G01N 21/65 356/301 |

\* cited by examiner

*Primary Examiner* — Abdullahi Nur

(74) *Attorney, Agent, or Firm* — Paratus Law Group, PLLC

(57) ABSTRACT

A hard-apertureless spectrometer includes a housing, a collimator configured to collimate light provided from a soft-aperture of a target, a diffraction grating configured to spectroscopically analyze the collimated light, a condenser configured to condense the spectroscopically analyzed light, and a photodetector configured to receive the condensed light output from the condenser and detect a target characteristic.

15 Claims, 5 Drawing Sheets

APERTURELESS SPECTROMETER

CROSS-REFERENCE TO PRIOR APPLICATIONS

This application claims priority to Korean Patent Application Nos. 10-2019-0157775 filed on Nov. 29, 2019 and 10-2020-0160960 filed on Nov. 26, 2020, which are hereby incorporated by reference in their entirety.

BACKGROUND

The present invention relates to an apertureless spectrometer.

A spectrometer refers to a device for decomposing light which is absorbed in or reflected by a target material, that is, for decomposing electromagnetic waves according to a difference in wavelength and measuring an intensity distribution for each wavelength.

SUMMARY

In order to perform spectroscopy using a spectrometer, an aperture is formed to allow target light to be introduced. However, there are problems in that the aperture limits a characteristic of light to degrade quality of the light to be spectroscopically analyzed, and a size of the spectrometer cannot be reduced due to the aperture.

The present invention is directed to solving the problems of the related art described above. That is, the present invention is directed to providing a spectrometer which does not degrade spectral quality because of not including an aperture and has a small size.

According to an aspect of the present invention, there is provided a hard-apertureless spectrometer including a housing, a collimator configured to collimate light provided from a soft-aperture of a target, a diffraction grating configured to spectroscopically analyze the collimated light, a condenser configured to condense the spectroscopically analyzed light, and a photodetector configured to receive the condensed light output from the condenser and detect a target characteristic.

According to one aspect of an embodiment, the soft-aperture may be formed by providing excitation light to a target.

According to one aspect of an embodiment, the hard-apertureless spectrometer may further include a light source configured to provide excitation light to the target to form the soft-aperture.

According to one aspect of an embodiment, the light source may be located outside the hard-apertureless spectrometer.

According to one aspect of an embodiment, the collimator, the diffraction grating, the condenser, and the photodetector may be housed in the housing.

According to one aspect of an embodiment, the collimator may be located outside the housing.

According to one aspect of an embodiment, the hard-apertureless spectrometer may further include a beam delivery device which is configured to provide light provided from the soft-aperture of the target to the collimator and includes a plurality of lenses.

According to one aspect of an embodiment, the light source may be located inside the hard-apertureless spectrometer, the spectrometer may further include any one of a dichroic mirror and a beam splitter, and the excitation light provided from the light source may be provided to the target through any one of the dichroic mirror and the beam splitter to form the soft-aperture.

According to another aspect of the present invention, there is provided a hard-apertureless Raman spectrometer including a light source configured to provide excitation light, a housing, a collimator configured to collimate Raman light formed by providing the excitation light to a soft-aperture of a target, a diffraction grating configured to spectroscopically analyze the collimated Raman light, a condenser configured to condense the spectroscopically analyzed Raman light, and an photodetector configured to receive the condensed light output from the condenser and detect a target characteristic.

According to one aspect of an embodiment, the soft-aperture may be formed by providing excitation light to a target.

According to one aspect of an embodiment, the hard-apertureless Raman spectrometer may further include a light source configured to provide excitation light to the target to form the soft-aperture.

According to one aspect of an embodiment, the light source may be located outside the hard-apertureless Raman spectrometer.

According to one aspect of an embodiment, the collimator, the diffraction grating, the condenser, and the photodetector may be housed in the housing.

According to one aspect of an embodiment, the collimator may be located outside the housing.

According to one aspect of an embodiment, the hard-apertureless Raman spectrometer may further include a beam delivery device which is configured to provide light provided from the soft-aperture of the target to the collimator and includes a plurality of lenses.

According to one aspect of an embodiment, the light source may be located inside the hard-apertureless Raman spectrometer, the Raman spectrometer may further include any one of a dichroic mirror and a beam splitter, and the excitation light provided from the light source may be provided to the target through any one of the dichroic mirror and the beam splitter to form the soft-aperture.

According to one aspect of an embodiment, the Raman spectrometer may further include one or more filters among a band pass filter, a long pass filter, and a short pass filter, which selectively filter only Raman light.

BRIEF DESCRIPTION OF THE DRAWINGS

The above and other objects, features and advantages of the present invention will become more apparent to those skilled in the art by describing exemplary embodiments thereof in detail with reference to the accompanying drawings, in which.

DETAILED DESCRIPTION

Figure 1:
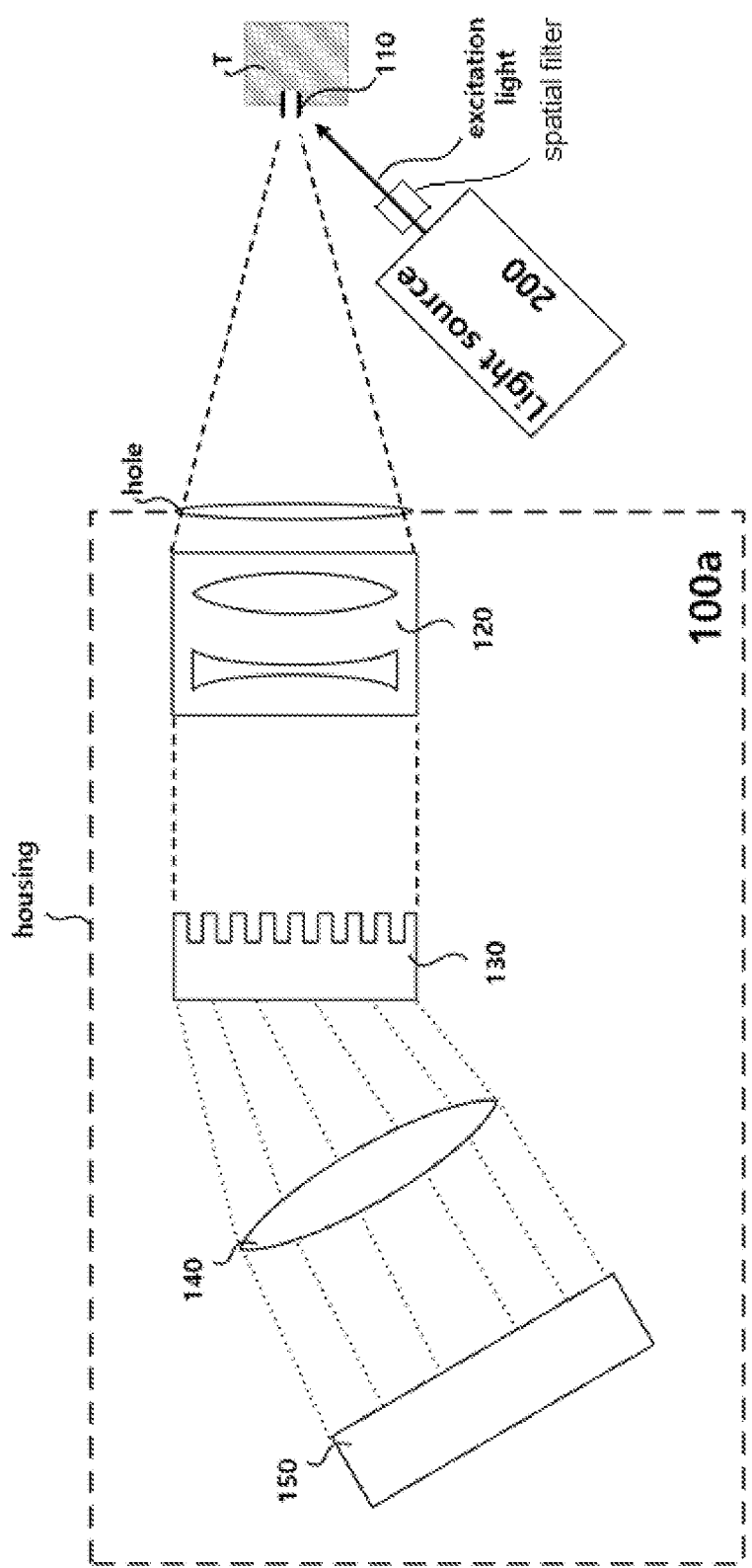
FIG. 1 is a schematic view illustrating a hard-apertureless spectrometer (100a) according to one embodiment.

Since the description of the present invention is merely embodiments for structural or functional description, the scope of the present invention should not be interpreted as being limited by the embodiments described herein. That is, since the embodiments can be variously changed and have various forms, it should be understood that the scope of the present invention includes equivalents capable of implementing technical ideas.

Meanwhile, the meaning of terms used herein should be understood as follows.

The singular form should be understood to include the plural form unless the context clearly dictates otherwise, and the terms "comprising," "having," or the like are used to specify the presence of a feature, a number, a step, an operation, a component, an element, or a combination thereof described herein, and they do not preclude the presence or addition of one or more other features, numbers, steps, operations, components, elements, or combinations thereof.

Each step may be differently performed from the order specified, unless a specific order is explicitly stated in the context. That is, each step may be performed in the same order as specified, may be substantially performed simultaneously, or may be performed in the reverse order.

The drawings referenced to describe the embodiments of the present invention are intentionally exaggerated in size, height, thickness, and the like for convenience of description and for ease of understanding and are not enlarged or reduced in proportion. In addition, certain components illustrated in the drawings may be intentionally reduced and expressed, and other components illustrated therein may be intentionally enlarged and expressed.

Unless otherwise defined all terms used herein have the same meanings as commonly understood by those skilled in the art to which the invention pertains. General terms that are defined in a dictionary shall be construed as having meanings that are consistent in the context of the relevant art and should not be interpreted as having an idealistic or excessively formalistic meaning unless clearly defined in this disclosure.

In embodiments illustrated below, all lenses are interchangeable with mirrors. For example, according to a curved surface, a convex lens is interchangeable with a concave mirror and the concave lens is interchangeable with the convex mirror. Both of a transmissive type grating and a reflective type grating may be used as a diffraction grating.

FIG. 1 is a schematic view illustrating a hard-apertureless spectrometer 100a according to one embodiment. Referring to FIG. 1, in the spectrometer 100a according to one embodiment, a hard-aperture which determines a wavelength resolution is not present, and only a hole for guiding light to an interior of a spectrometer is present. The spectrometer 100a according to one embodiment includes a collimator 120 for forming incident light as collimated light, a diffraction grating 130 for dispersing and providing the collimated light, a condenser 140 for collecting spatially spread light after the dispersion, and a photodetector 150 for detecting a target characteristic from the light collected by the condenser 140.

A slit or an aperture is generally formed at an inlet of a spectrometer according to the related art so as to obtain a separation margin of collimated light and a dispersion resolution. Since the aperture formed in the spectrometer according to the related art is physically present, the aperture is hereinafter referred to as a hard aperture. Since a size of the hard-aperture defines a minimum value of a spatial size of each wavelength region which is dispersed and exhibited, the size of the hard-aperture determines a dispersion resolution and/or a wavelength resolution of the spectrometer. In this case, the hard-aperture corresponds to a spatial filter through which incident light passes.

The hard-aperture limits a characteristic of light provided to the spectrometer, and there is a problem in that the spectrometer cannot be made small in size due to the hard aperture. However, a spectrometer according to one embodiment does not employ a hard-aperture and employs a soft-aperture to solve the above-described problem according to the related art.

One embodiment of the present invention relates to a spectrometer using a soft-aperture 110. According to one embodiment, the soft-aperture 110 is employed so that a simplified spectrometer may be formed. The soft-aperture 110 is an aperture which is virtually formed in a spectroscopic region of a target to be spectroscopically analyzed. Hereinafter, the term "soft-aperture" (the soft-aperture 110) is used as a concept that contrasts with a hard-aperture which is actually physically present.

The soft-aperture 110 refers to a focal area or an imaging area which is formed on a target to be transmitted to the collimator 120 of the spectrometer 100a. The soft-aperture 110 may include a region which is imaged on the target by a beam delivery device located outside the spectrometer 100a.

For spectroscopy, light generated in a region of the soft-aperture 110 is transmitted into the spectrometer 100a. The transmitted light is converted into collimated light by the collimator 120 in the spectrometer 100a, the collimated light is spectroscopically analyzed as beams of different wavelengths by passing through or being reflected from the diffraction grating 130, and the beams which were spatially spread are condensed by the condenser 140 to detect a target characteristic in the photodetector 150.

A target T is an object to be spectroscopically analyzed. The soft-aperture 110 formed on the target T may have various shapes such as polygonal shapes including a triangle shape and a quadrangular shape, a circular shape, an elliptical shape, and a straight line shape. In one embodiment, excitation light provided by a light source 200 is irradiated onto the target T, and thus the region of the soft-aperture 110 is formed. The light source 200 may form a focal point on the target T using a lens (not shown) or a mirror 210 (see FIG. 5). The focal point forms a spectroscopic region required for spectroscopy and serves as the soft-aperture 110 which guides light generated from the target T to the spectrometer 100a. For example, as shown in FIGS. 1 to 4, the light source 200 may be located outside spectrometers 100a, 100b, 100c, and 100d. Alternatively, as shown in FIG. 5, the light source 200 may be located inside a spectrometer 100e.

The light source 200 may control a wavelength and an intensity of the excitation light provided therefrom and a size and a shape of the region of the soft-aperture 110. In one embodiment, the size of the soft-aperture 110 may be determined by a size of the focal point of the excitation light. The shape of the soft-aperture 110 may be arbitrarily formed in a circular shape, an elliptical shape, or a rectangle shape by installing a spatial filter on an optical path through which the excitation light reaches the target.

Figure 2:
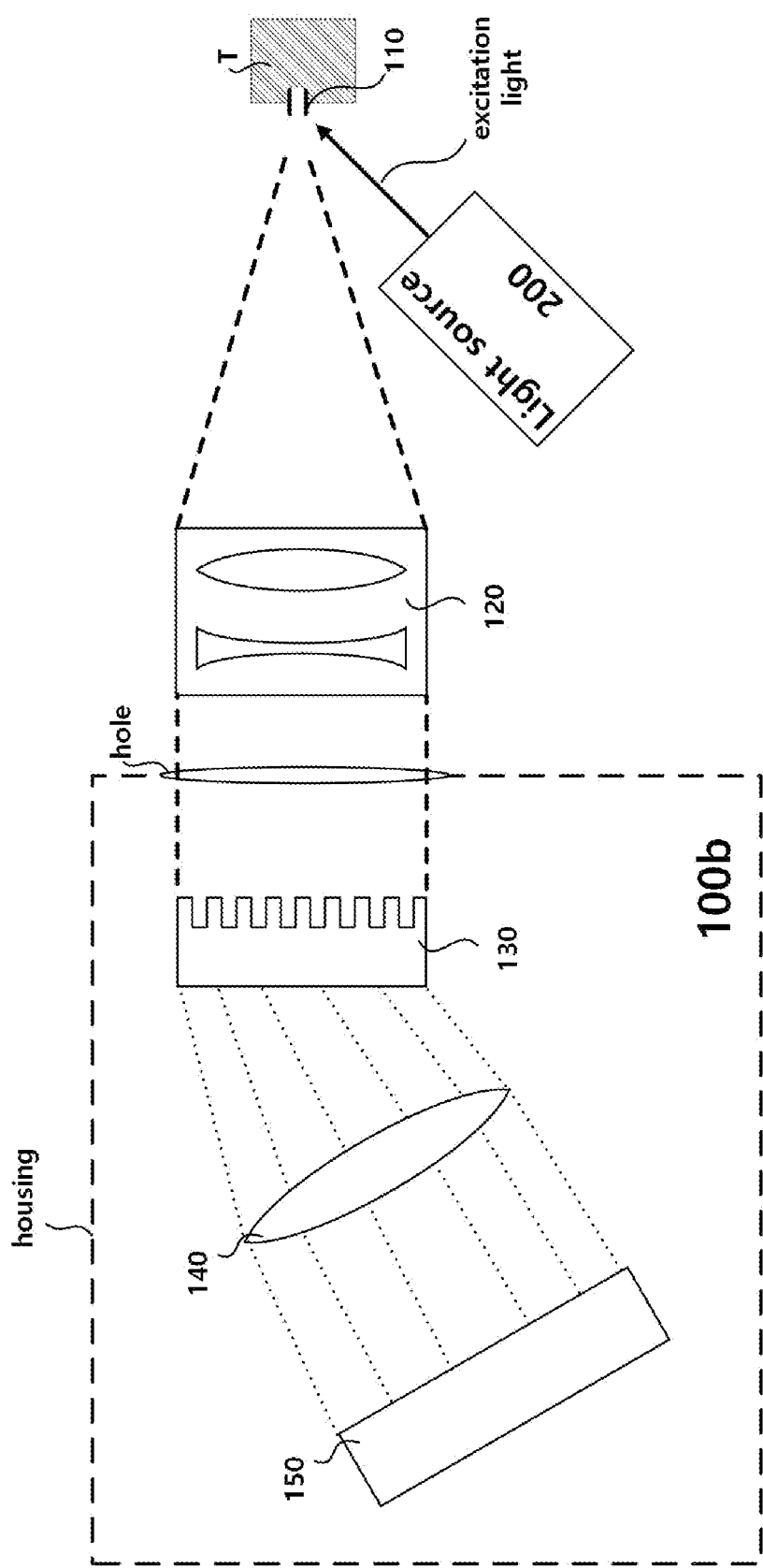
FIG. 2 is a schematic view illustrating a spectrometer (100b) according to another embodiment.

FIG. 2 is a schematic view illustrating the spectrometer 100b according to another embodiment. Hereinafter, for concise and definite description, descriptions of components which are the same as or similar to those of the above-described embodiment will be omitted herein. Referring to FIG. 2, since a collimator 120 is located outside the spectrometer 100b, values such as a focal length and a diameter may be freely varied, as necessary.

In the spectrometer according to the related art, a fixed optical system is employed as optical components such as a collimator and the like. However, unlike the related art, the present embodiment may provide an advantage in that the collimator 120 is appropriately selected and used to more effectively transmit the spectroscopic region formed in a soft-aperture 110 of a target T to the spectrometer 100b.

For example, a hole through which light collimated and generated in a spectroscopic region of the target T passes is formed at an inlet of the spectrometer 100b to guide the light to be spectroscopically analyzed into the spectrometer 100b.

Since the light collimated into parallel light by the collimator 120 is guided to the spectrometer 100b, a size of a focal point of the collimated light is determined by a size of the collimator 120. Thus, since a size of the hole according to the present embodiment may be larger than the size of the hole shown in FIG. 1, external light may enter the spectrometer 100b.

In order to minimize an effect of such stray light, a tube bellow is disposed in an optical path around the hole to scatter and remove the stray light, or one or more filters of various filters among band pass filters, long pass filters, and short pass filters are disposed in the optical path so that it is possible to minimize the effect of the stray light entering the spectrometer 100b.

Figure 3:
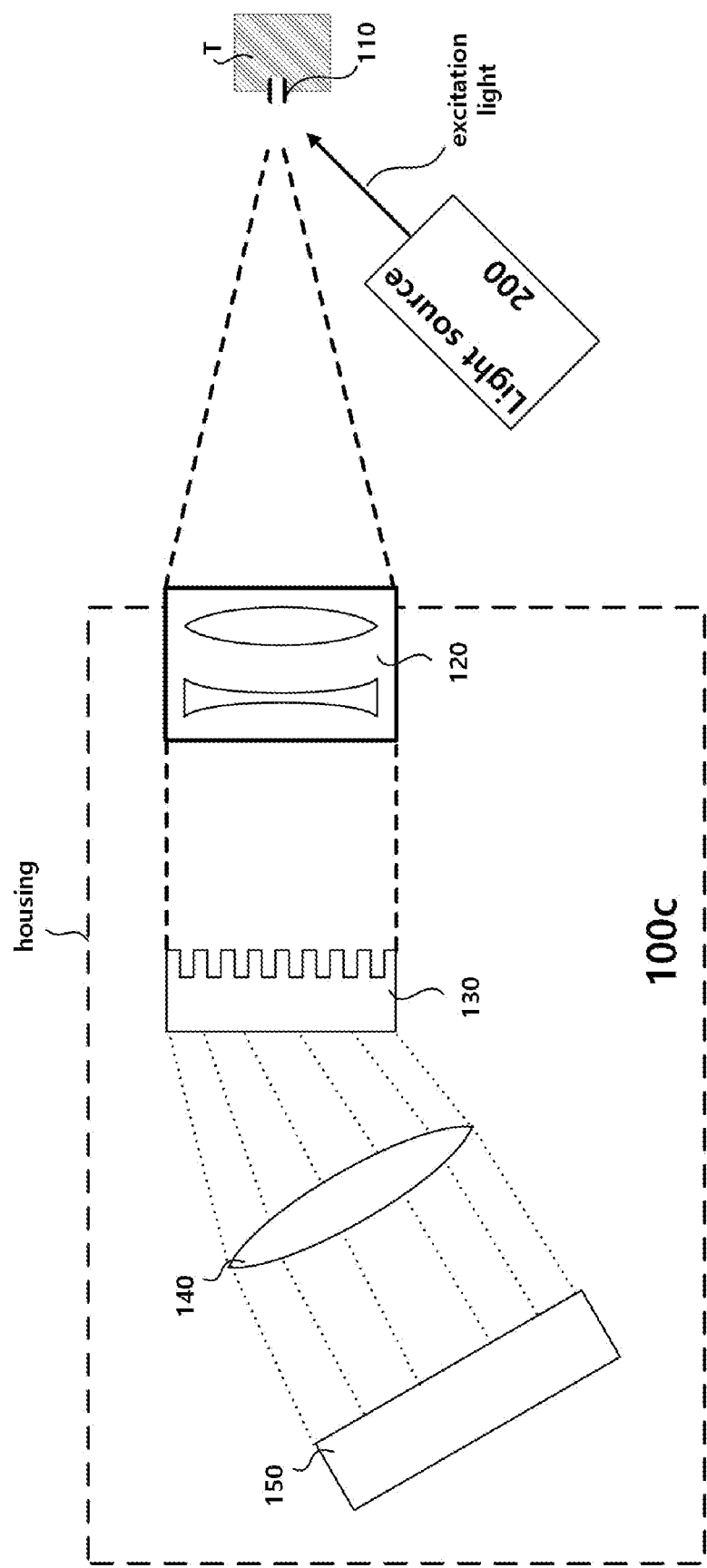
FIG. 3 is a schematic view illustrating a spectrometer (100c) according to still another embodiment.

FIG. 3 is a schematic view illustrating the spectrometer 100c according to still another embodiment. Hereinafter, for concise and definite description, descriptions of components which are the same as or similar to those of the above-described embodiment will be omitted herein. Referring to FIG. 3, a collimator 120 is located at a hole which is an inlet of the spectrometer 100c. According to the present embodiment, any one collimator among a plurality of collimators may be selected, as necessary, to be combined with the spectrometer 100c so that a focal length and a diameter may be freely adjusted.

As in the embodiment shown in FIG. 2, even in the embodiment shown in FIG. 3, a size of a focal point of light is determined by a size of the collimator 120. Similarly, in order to minimize an effect of such stray light entering the spectrometer 100c, a tube bellow is disposed in an optical path around the hole to scatter and remove the stray light, or various filters, such as one or more filters among band pass filters, long pass filters, and short pass filters, are disposed in the optical path so that it is possible to minimize the effect of the stray light entering the spectrometer 100c. Alternatively, the collimator 120 may be coated with a filter material so that the collimator 120 may also perform such a filter function.

Figure 4:
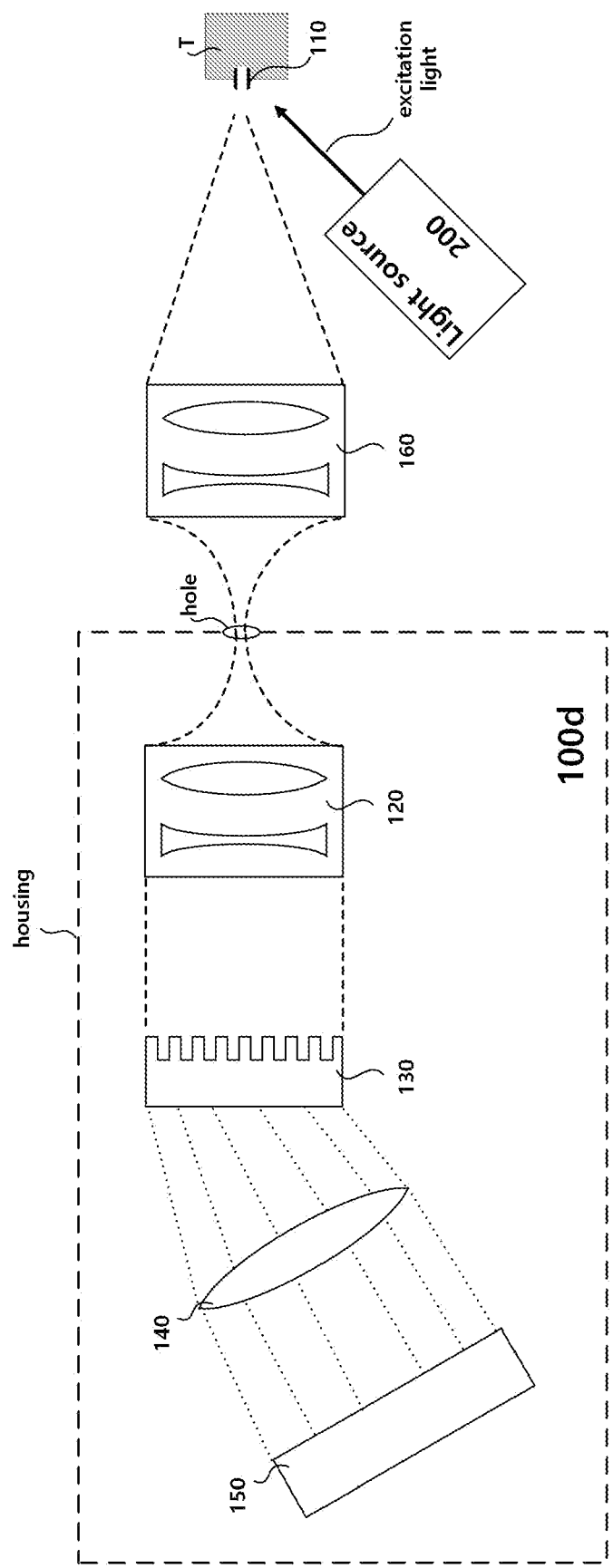
FIG. 4 is a schematic view illustrating a spectrometer (100d) according to yet another embodiment.
Figure 5:
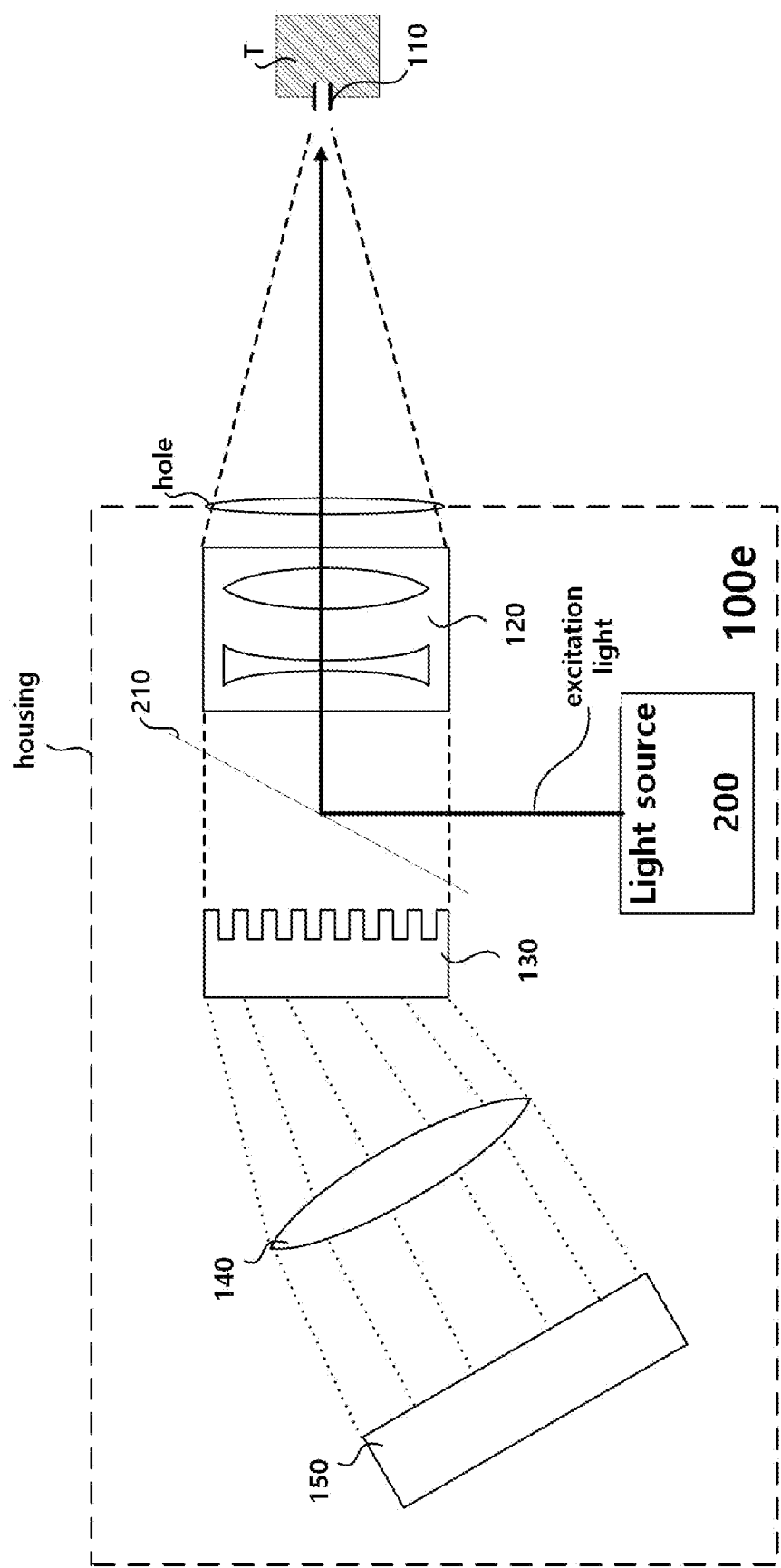
FIG. 5 is a schematic view illustrating a spectrometer (100e) according to yet another embodiment.

FIG. 4 is a schematic view illustrating a spectrometer 100d according to yet another embodiment. Hereinafter, for concise and definite description, descriptions of components which are the same as or similar to those of the above-described embodiment will be omitted herein. Referring to FIG. 4, the spectrometer 100d may further include a beam delivery device 160. The beam delivery device 160 may be an optical system for transmitting light formed in a soft-aperture 110 to a collimator 120 in the spectrometer 100d and include a plurality of lenses. For example, the beam delivery device 160 may be an imaging device. According to the present embodiment, light transmission efficiency to the spectrometer 100d is improved by the beam delivery device 160.

FIG. 5 is a schematic view illustrating a spectrometer 100e according to yet another embodiment. Hereinafter, for concise and definite description, descriptions of components which are the same as or similar to those of the above-described embodiment will be omitted herein. Referring to FIG. 5, a light source 200 is located in the spectrometer 100e. Excitation light provided from the light source 200 is reflected by a dichroic mirror 210 and provided to a target T to form a soft-aperture 110. According to an embodiment not shown in the drawing, the excitation light provided from the light source 200 is provided to the target T by a beam splitter (not shown) to form the soft-aperture 110.

Another example of a spectrometer using an excitation light may be a Raman spectrometer. The Raman spectrometer is a spectrometer which uses a region formed in a target by excitation light which is primary light, or Raman light of secondary light having a different wavelength formed by the primary light as the soft-aperture 110, and the spectrometer 100e according to the present embodiment serves as a Raman spectrometer. In this case, optical filters such as bandpass filters, long pass filters, and/or short pass filters, which are capable of filtering only Raman light, may be located inside or outside the spectrometer 100e.

According to the embodiments of the present invention, since a hard-aperture limiting a characteristic of light is not included, there is an advantage in that the characteristic of light cannot be limited, and a size of a spectrometer can be reduced.

In order to aid understanding of the present invention, the description has been made with reference to the embodiments shown in the drawings, but these embodiments are for implementation and are merely illustrative. Thus, those skilled in the art will appreciate that various modifications and equivalent other embodiments can be derived without departing from the scope of the present invention. Therefore, the true technical scope of the present invention should be defined by the appended claims.

What is claimed is:

1. A hard-apertureless spectrometer comprising:
   a light source configured to provide excitation light to a target to form a focal point on the target such that a soft-aperture which is a virtual aperture corresponding to the focal point of the target is formed on the target;
   a spatial filter located on an optical path through which the excitation light reaches the target from the light source;
   a housing including a hole through which light provided from the soft-aperture on the target enters;
   a collimator configured to collimate the light provided from the soft-aperture of the target;
   a diffraction grating configured to spectroscopically analyze the collimated light;
   a condenser configured to condense the spectroscopically analyzed light; and
   a photodetector configured to receive the condensed light output from the condenser and detect a target characteristic;
   wherein a size of the soft-aperture is determined by a size of the focal point of the excitation light, and a shape of the soft-aperture is determined by the spatial filter.

2. The hard-apertureless spectrometer of claim 1, wherein the light source is located outside the hard-apertureless spectrometer.

3. The hard-apertureless spectrometer of claim 1, wherein the collimator, the diffraction grating, the condenser, and the photodetector are housed in the housing.

4. The hard-apertureless spectrometer of claim 1, wherein the collimator is located outside the housing.

5. The hard-apertureless spectrometer of claim 1, further comprising a beam delivery device which is configured to provide the light provided from the soft-aperture of the target to the collimator and includes a plurality of lenses or mirrors.

6. The hard-apertureless spectrometer of claim 1, wherein:
the light source is located inside the hard-apertureless spectrometer;
the hard-apertureless spectrometer further includes a dichroic mirror; and
the excitation light provided from the light source is provided to the target through any one of a dichroic mirror and a beam splitter to form the soft-aperture.

7. The hard-apertureless spectrometer of claim 1, wherein:
one or more filters among a tube bellow, a band pass filter, a long pass filter, and a short pass filter are further disposed in the hole; or
the collimator is coated with a filter material.

8. A hard-apertureless Raman spectrometer comprising:
a light source configured to provide excitation light to a target to form a focal point on the target such that a soft-aperture which is a virtual aperture corresponding to the focal point of the target is formed on the target;
a spatial filter located on an optical path through which the excitation light reaches the target from the light source;
a housing including a hole through which light provided from the soft-aperture on the target enters;
a collimator configured to collimate Raman light formed by providing the excitation light to the soft-aperture of the target;
a diffraction grating configured to spectroscopically analyze the Raman light;
a condenser configured to condense the spectroscopically analyzed Raman light; and
a photodetector configured to receive the condensed light output from the condenser and detect a target characteristic,
wherein a size of the soft-aperture is determined by a size of the focal point of the excitation light, and a shape of the soft-aperture is determined by the spatial filter.

9. The hard-apertureless Raman spectrometer of claim 8, wherein the light source is located outside the hard-apertureless Raman spectrometer.

10. The hard-apertureless Raman spectrometer of claim 8, wherein the collimator, the diffraction grating, the condenser, and the photodetector are housed in the housing.

11. The hard-apertureless Raman spectrometer of claim 8, wherein the collimator is located outside the housing.

12. The hard-apertureless Raman spectrometer of claim 8, further comprising a beam delivery device which is configured to provide the light provided from the soft-aperture of the target to the collimator and includes a plurality of lenses or mirrors.

13. The hard-apertureless Raman spectrometer of claim 8, wherein:
the light source is located inside the hard-apertureless Raman spectrometer;
the Raman spectrometer further includes any one of a dichroic mirror and a beam splitter; and
the excitation light provided from the light source is provided to the target through any one of the dichroic mirror and the beam splitter to form the soft-aperture.

14. The hard-apertureless Raman spectrometer of claim 8, further comprising one or more filters among a band pass filter, a long pass filter, and a short pass filter, which selectively filter only Raman light.

15. The hard-apertureless Raman spectrometer of claim 8, wherein:
one or more filters among a tube bellow, a band pass filter, a long pass filter, and a short pass filter are further disposed in the hole; or
the collimator is coated with a filter material.

* * * * *